United States Patent
Medvinsky et al.

(10) Patent No.: US 9,652,599 B2
(45) Date of Patent: May 16, 2017

(54) RESTRICTED CODE SIGNING

(71) Applicant: ARRIS Enterprises, Inc., Suwanee, GA (US)

(72) Inventors: Alexander Medvinsky, San Diego, CA (US); Ali Negahdar, Duluth, GA (US); Xin Qiu, San Diego, CA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 174 days.

(21) Appl. No.: 14/737,463

(22) Filed: Jun. 11, 2015

(65) Prior Publication Data

US 2015/0363576 A1 Dec. 17, 2015

Related U.S. Application Data

(60) Provisional application No. 62/010,761, filed on Jun. 11, 2014.

(51) Int. Cl.
| H04L 29/06 | (2006.01) |
| G06F 21/10 | (2013.01) |
| H04L 9/32 | (2006.01) |
| G06F 11/00 | (2006.01) |
| G06F 12/14 | (2006.01) |
| G06F 12/16 | (2006.01) |

(52) U.S. Cl.
CPC ............ G06F 21/10 (2013.01); H04L 9/3247 (2013.01); H04L 63/123 (2013.01); H04L 63/126 (2013.01); *G06F 2221/0724* (2013.01)

(58) Field of Classification Search
None
See application file for complete search history.

(56) References Cited

U.S. PATENT DOCUMENTS

| 8,572,368 | B1 | 10/2013 | Deacon |
| 9,141,150 | B1 * | 9/2015 | Trundle ............... G06F 1/1694 |
| 9,338,012 | B1 * | 5/2016 | Naik .................... H04L 9/3247 |
| 2005/0246523 | A1 * | 11/2005 | Mauro, II ............ H04L 9/3247 |
| | | | 713/156 |

(Continued)

FOREIGN PATENT DOCUMENTS

WO 2005/112340 A1 11/2005

OTHER PUBLICATIONS

PCT Search Report & Written Opinion, Re: Application No. PCT/US2015/035440, dated Oct. 6, 2015.

(Continued)

*Primary Examiner* — Shin-Hon Chen
(74) *Attorney, Agent, or Firm* — Thomas A. Ward

(57) ABSTRACT

A method and system is provided for signing data such as code images. In one embodiment, the method comprises receiving, from a requestor, a request to sign the data according to a requested configuration selected from a first configuration, in which the data is for use with any of the set of devices, and a second configuration in which the data is for use only with a subset of a set of devices; modifying the data according to the requested configuration; generating a data signature using the modified data; and transmitting the generated data signature to the requestor. Another embodiment is evidenced by a processor having a memory storing instructions for performing the foregoing operations.

14 Claims, 9 Drawing Sheets

(56) References Cited

U.S. PATENT DOCUMENTS

| | | | |
|---|---|---|---|
| 2006/0075462 A1* | 4/2006 | Golan | G06F 21/54 |
| | | | 726/1 |
| 2007/0074033 A1* | 3/2007 | Adams | G06F 21/629 |
| | | | 713/176 |
| 2007/0074034 A1* | 3/2007 | Adams | G06F 21/629 |
| | | | 713/176 |
| 2009/0287933 A1* | 11/2009 | Beckwith | H04L 9/3255 |
| | | | 713/176 |

OTHER PUBLICATIONS

"Data-Over-Cable Service Interface Specifications DOCSIS 3.0; Security Specification", Cable Television Laboratories, Inc., Document CM-SP-SECv3.0-104-070518, May 18, 2007.

* cited by examiner

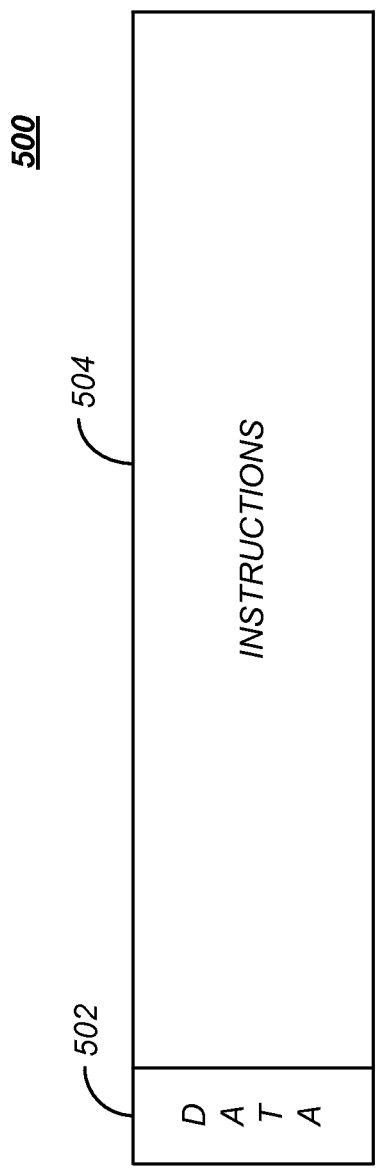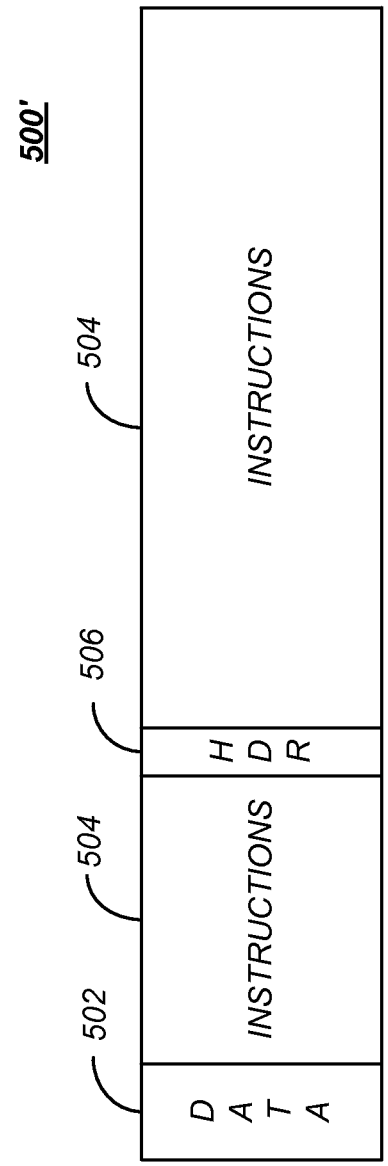

RESTRICTED CODE SIGNING

CROSS-REFERENCE TO RELATED APPLICATIONS

This application claims benefit of U.S. Provisional Patent Application No. 62/010,761, entitled "RESTRICTED CODE SIGNING," by Alexander Medvinsky, Ali Negandar, and Xin Qiu, filed Jun. 11, 2014, which application is hereby incorporated by reference herein.

BACKGROUND OF THE INVENTION

1. Field of the Invention

The present invention relates to systems and methods for digitally signing data, and in particular to a system and method for enforcing restrictions regarding the digital signing and use of code images.

2. Description of the Related Art

Data signing is a process of digitally signing data to confirm that the author of the data is who it purports to be and to guarantee that the data has not been altered or corrupted since it was signed by use of a cryptographic hash. Data signing is particularly useful in cases wherein the data comprises software code, such as executables and scripts, as corrupted or hacked software code is particularly pernicious.

FIG. 1 is a diagram illustrating the code signing and verification process. In order to sign the code, the software publisher needs to generate a private key 106A-public key 106B pair and submit the public key 106B to a certificate authority (CA) along with a request to issue a code signing certificate. The CA verifies the identity of the publisher and authenticates the publisher's digitally signed certificate request. If this vetting and key verification process is successful, the CA bundles the identity of the publisher with the public key 106B and signs the bundle, creating the code signing certificate 112.

Armed with the code signing certificate 112, the publisher is ready to sign the code. When the code is signed, the original file is added to several pieces of information. This bundled information is used by the recipient's user agent to authenticate the publisher and check for code-tampering.

A hash of the data 110 (hereinafter alternatively referred to as code) is produced, using a hashing module 102. The hashed code is a cryptographically unique representation of the code, and is only reproducible by the recipient of the code using unaltered code and the same hashing algorithm that was used to create the hash. This hash is later signed using the publisher's private key 106A, as described below. The reason the hash instead of the code is signed is that public-key algorithms are inefficient for signing large objects, and the hashing algorithm creates a fixed-length digest of the code that is much smaller in side.

Next, the hashed code is digitally signed using the publisher's private key 104A, by the signing module 104A. This can be accomplished by passing the hash through a signing algorithm implemented by the signing module 104A using the publisher's private key 106A as an input. Information about the publisher and the CA may be drawn from the code signing certificate 112 and incorporated into the signature. Next, the original code 110, signature, and code signing certificate are bundled together. The code signing certificate 112 is added to the bundle (as the public key it contains is required to authenticate the code when it is verified).

The signature is verified as also shown in FIG. 1. First, the original code is passed through the same hashing module 102 implementing the same hashing algorithm described above to create hashed code. The public key 106B of the publisher is extracted from the bundle and applied to the signed hash 106 information, and applied to the signed hash 106 by signature module 104B, thus applying the public key 106B to reveal the hash that was calculated as described above when the file was signed. The two hashes (hashed data 1 and hashed data 2) are compared; if equal, then the code has not changed and the signature is considered valid. Next, the code signing certificate 112 is checked to make sure that it was signed by a trusted CA, and the expiry date of the code signing certificate 112 is checked. The code signing certificate may also be checked against the revocation lists to be sure that it is valid. If the code signing certificate 112 was signed by a trusted CA and has not been revoked, the data or code 110 is considered valid, it is accepted for use by the user device. If the file is not considered valid or if the CA is not a trusted CA, the user device may provide the option of accepting and executing the code from an unknown publisher or rejecting the code.

Some code signing formats are accepted by many different device models. For instance, code signing compatible with the Data Over Cable Services Interface Specification (DOCSIS) is utilized in a number of different consumer premises equipment (CPE) devices which may include an embedded cable modem and other functionality such as a set-top-box (STB), integrated receiver/decoder (IRD) used to receive media programs or a Voice Over Internet Protocol (VoIP) gateway. For all types of devices that include a DOCSIS cable modem, a secure code download may be signed using the DOCSIS format. Furthermore, each company or software publisher is generally issued one Code Verification Certificate (CVC) by a CA such as CABLE LABS for the purpose of DOCSIS code signing. Therefore, a single signing key is utilized in that case to sign code destined for many different device models.

However, it is sometimes undesirable for a particular employee of the publisher to have the ability to sign code downloads for many device models. This may be a concern for employees within the company or publisher that makes the corresponding devices and is even more of a concern for employees of a cable operator publishing new code which also desires to build and then sign code images using the same DOCSIS code signing format using a signing key which belongs to the device manufacturer.

What is needed is a system and method which restricts the ability to sign code based upon the status of a particular employee and/or the devices for which the code is intended to be installed. Described below is a solution based on a code signing server which has different configurations assigned to employees which can sign code for any device vs. employees usually of other companies) that are restricted go signing code only for specific configurations corresponding to specific device models.

SUMMARY OF THE INVENTION

To address the requirements described above, the present invention discloses a method and apparatus for signing data. In one embodiment, the method comprises receiving, from a requestor, a request to sign the data according to a requested configuration selected from a first configuration, in which the data is for use with any of the set of devices, and a second configuration in which the data is for use only with a subset of a set of devices; modifying the data according to the requested configuration; generating a data signature using the modified data; and transmitting the generated data signature to the requestor. Another embodi-

BRIEF DESCRIPTION OF THE DRAWINGS

Referring now to the drawings in which like reference numbers represent corresponding parts throughout:

FIGS. 5A and 5B are diagrams illustrating one embodiment of a code image and a modified code image, respectively;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

As described above, some code signing formats are accepted by many different device models. For example, DOCSIS code signing as specified in "Data-Over-Cable Service Interface Specifications, DOCSIS 3.0 Security Specification CM-SP-SECv3.0-I04-070518," by CableLabs (hereby incorporated by reference herein and hereinafter alternatively referred to as "DOCSIS specification") is utilized in a number of different CPE devices which may include an embedded cable modem and other functionality such as an STB or a VoIP gateway.

For all types of devices that include a DOCSIS cable modem, a secure code download may be signed using the DOCSIS format defined in the DOCSIS specification. Furthermore, each company is generally issued one CVC by CABLELABS for the purpose of DOCSIS code signing. Therefore, a single signing key is utilized in that case to sign code for many different device models.

Previously, device manufacturers have been the only entities signing code for their devices. In such situations, the single code-signing key provided to manufacturers may be shared across many device models. This may be a concern for employees within the company that makes the corresponding devices. Also, network operators, who's systems use such devices, may author code image of their own for installation on the manufacturer's devices, and want to use the manufacturer's code-signing key to safely deliver the code to the devices using the same DOCSIS code-signing format.

This specification describes a system and method that, even with a common signing key, enables restrictions to be placed upon code signing—such that signed images work only on specific device models. This allows code-signing paradigms to be implemented in which some individuals within the publisher or company may have the authorization to sign code that will work on all of the models which share the same signing key, while other individuals will only be able to sign code images for specific device models.

Figure 1:
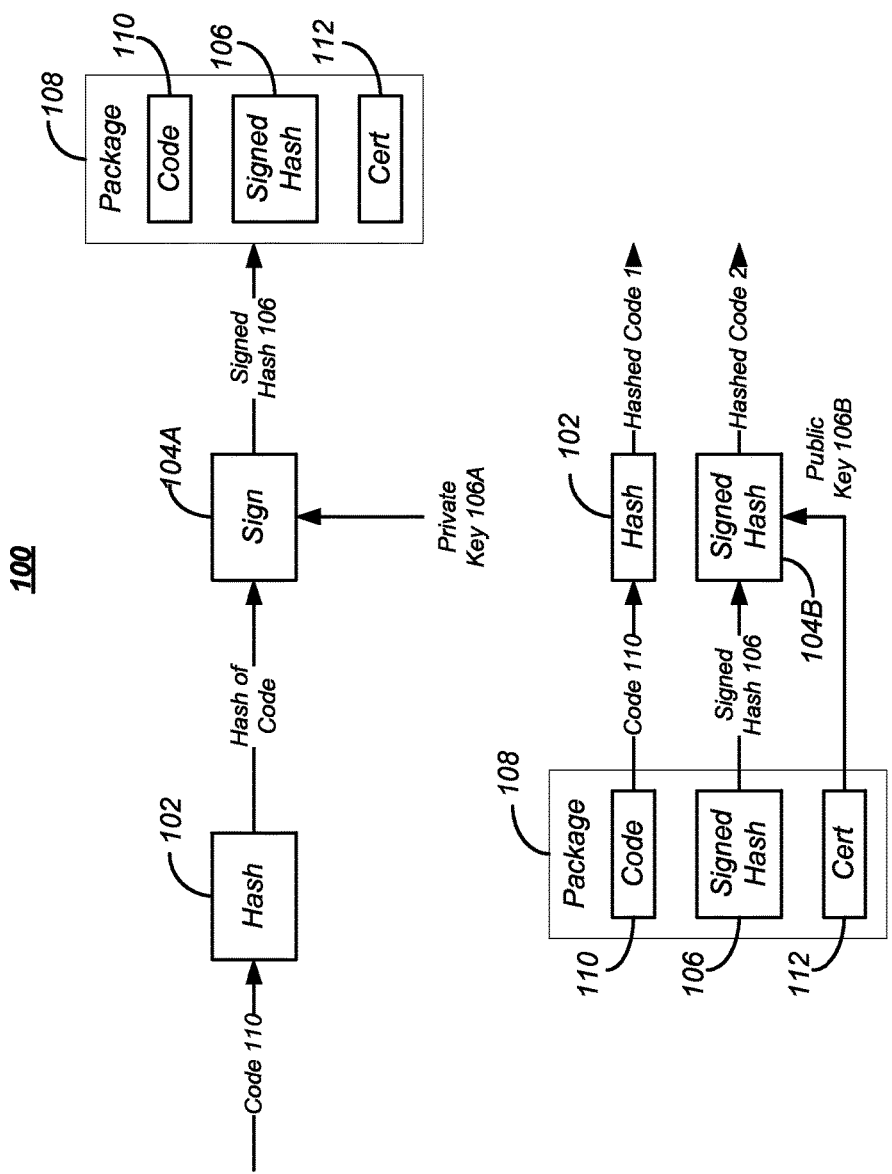
FIG. 1 is a diagram illustrating a code signing and verification process.
Figure 2:
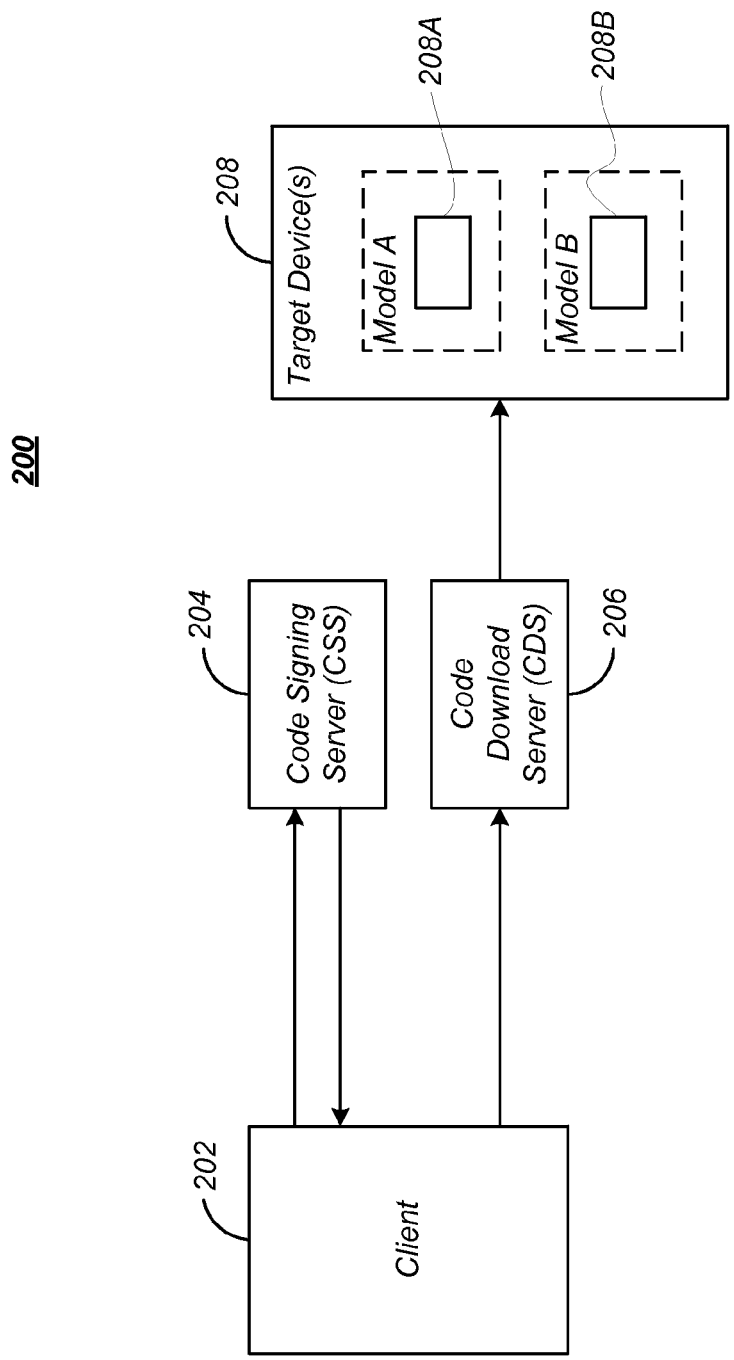
FIG. 2 is a diagram illustrating a code signing system.

FIG. 2 is a diagram illustrating a code signing system 200. The system 200 includes a client 202, which may include a privileged or internal client (described further below with respect to FIGS. 3-6) and/or an unprivileged or external client (also described further below). In either case, the client 202 sends signature requests to the code signing server (CSS) 204 and receives signed code images from the CSS 204. Those signed images are then provided to a code download server (CDS) 206 where they can be obtained by target devices 208 as further described below.

First Embodiment

Target devices 208 may be delineated into one or more sets of target devices 208, and each set of target devices 208 may be further delineated into one or more subsets of target devices 208. A target device 208 subset may be defined as a group of target devices 208 with similar characteristics relevant to the code image to be provided to the target device 208. Target devices 208 may be grouped into subsets, for example, by model number, serial number range, or software versions. Simply for purposes of illustration, the following discussion defines the target device 208 sets according to two model types: Model A (of which target device 208A is a member and target device 208B is not), which are intended to accept and execute all code images (signed by both privileged and unprivileged clients 202) and Model B (of which target device 208B is a member and target device 208A is not), which are intended to accept only code images signed by privileged clients 202.

The following embodiments take advantage of an architecture where code signing is done on a secure CSS 204 and where different users are authorized to sign the code image using different code signing configurations on that same server 204. Some code signing configurations result in signed images which work on all target devices 208, while others are signed in such a manner that they will only execute successfully on selected subsets of the target devices 208 for which a specific developer or requestor is authorized.

Figure 3:
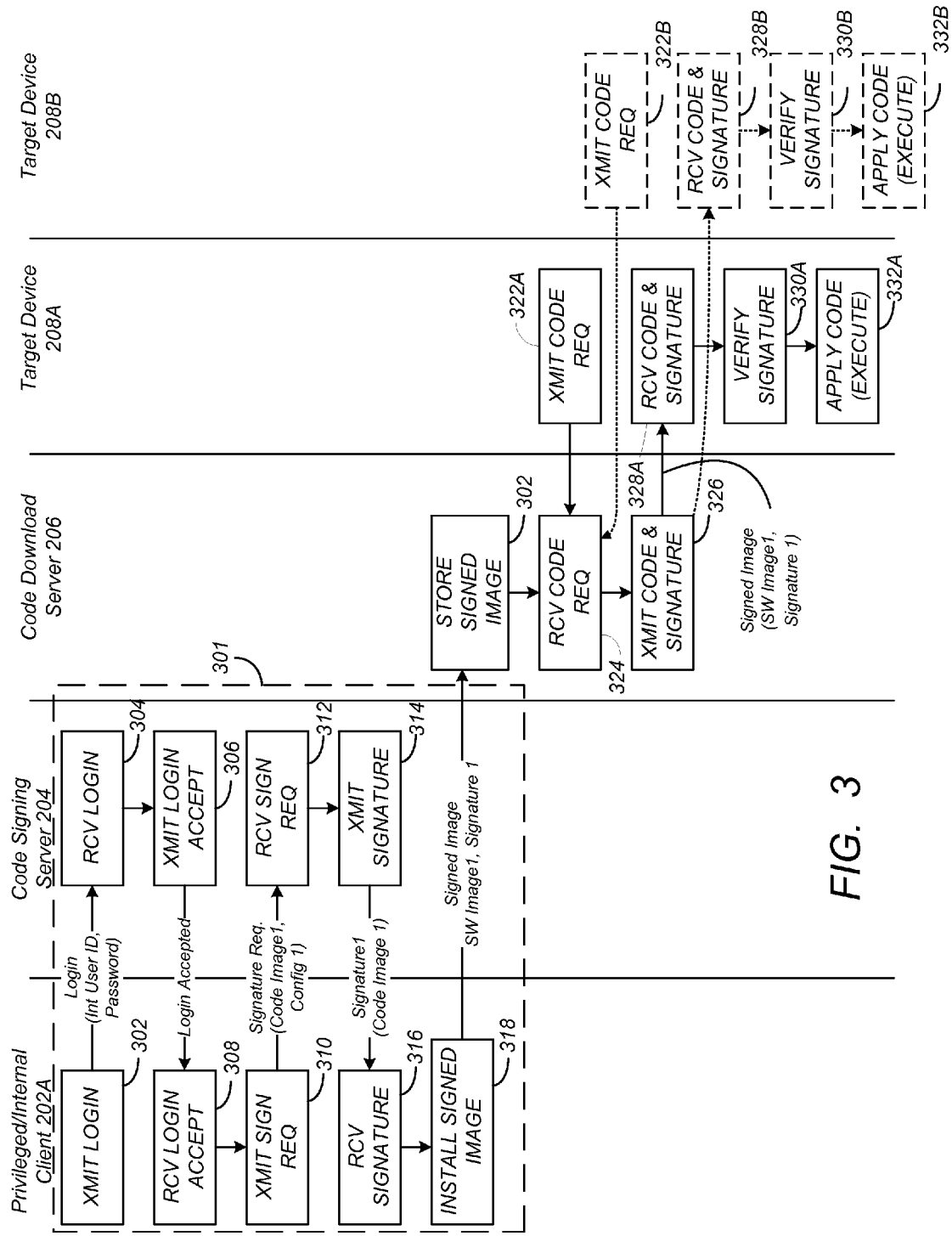
FIG. 3 is a diagram illustrating a process by which a privileged client signs and delivers code images intended for use in all target devices.

FIG. 3 is a diagram illustrating the foregoing first embodiment of a process by which a client 202 that is internal to the CSS 204 or otherwise privileged (hereinafter referred to as a privileged client 202A) signs and delivers code images intended for use in all target devices, including target device 208A and target device 208B.

The process beings with an optional login procedure wherein the privileged client 202A logs into a CSS 204 by transmitting a login request, as shown in block 302. The login request may comprise credentials such as an identifier of the privileged client 202A making the login request (user ID) and a secret password. The use of a user ID and password prevents unauthorized users from using the CSS 204, and in particular, as a privileged client 202A. The privileged client 202A may log in to the DSS 204 over a web interface using a standard browser like INTERNET EXPLORER, GOOGLE CHROME, or FIREFOX. Alternatively, the login may be accomplished via an online transaction with a client 202 application and without any user interaction.

The CSS 204 receives the login request as shown in block 304, checks the login credentials to verify that the privileged client 202A is authorized to request signature of an code image. If the privileged client 202A is so authorized, the CSS 204 transmits a message to the privileged client 202A indicating that the privileged client's login credentials have been accepted. This message is received by the privileged client 202A, as shown in block 308. After verifying the privileged client 202A credentials of the user, the DSS 204 enters a state where it will accept code signing requests, but only based on code signing configurations for which the client 202 associated with the user ID and password is authorized. In the example presented in FIG. 3, the client is a privileged client 202A and is authorized to request signature of code that is executable on all target devices 208.

The privileged client 202A then transmits a request to sign the code, as shown in block 310. In one embodiment, the request includes configuration data (e.g. "ConfigN") describing a requested configuration, which determines which code signing format and code signing key to be used in signing the code image.

The configuration data received from the clients 202 may include a detailed description of whether the code is to be modified, and how such modifications are to be made to the code before signing, or may simply comprise a flag, number, or other artifice, designating that a particular configuration be used, with the detailed description of how the code is to be modified and signed obtained from a source other than the client 202.

In one embodiment, the requested configuration is selected to be either a first configuration (e.g. "Config1") in which the code is intended for use with any of the set of target devices 208 and a second configuration (e.g. "Config2") in which the code is for use with only a subset of a set of target devices 208. For example, by associating "Config1" with the request to sign the code (e.g. by providing it with the request), the client 202 may make a request to sign a code image which can run on any target device 208 model which accepts the specific signing key used in signing the code image (e.g. on any DOCSIS CPE device belonging to a specific manufacturer). Typically, such a request will only be fulfilled by the CSS 204 if the client 202 making the request is internal to the device manufacturer or privileged to do so (and hence, a privileged client 202A).

The privileged client 202A also provides the CSS 204 access to the code to be signed, either by transmitting it along with or in conjunction with the request itself, or by transmitting an web address or other information that the CSS 204 may use to access the code image to be signed.

In block 312, the CSS 204 receives the signature request. The CSS 204 checks to determine if the client 202 that transmitted the request is a client 202 with sufficient privileges for the requested configuration. If the requesting client 202 has insufficient privileges, the request is denied. However, if the requesting client has sufficient privileges (e.g. the client is a privileged client 202A), the CSS 204 generates the requested signature according to the requested configuration.

Signature Generation

The CSS 204 generates the code signature by modifying the code to be signed according to the configuration requested by the client 202 (which may include leaving the code unmodified if the requested configuration indicates the code should be signed in unmodified form), and generating the code signature using the (potentially) modified code.

In the example illustrated in FIG. 3, the requesting client 202A is privileged, and therefore authorized to issue signed code to either all of the target devices or a subset of such devices. Further, the privileged client 202A has requested a configuration "Config1" that indicates that the privileged client 202A desires that the code image it is submitting for signature is intended to be executable by all of the set of target devices 208 and not merely the subset of devices 208. Responding to the privileged client's request, the CSS 204 signs the code (code image 1) without modification to create the signature (signature1). Since all of the devices 208 are able to execute the unmodified code, the CSS 204 has thus created a signature that can be used to provide executable code to all device types.

The CSS 204 returns the computed code signature to the privileged client 202A, as shown in block 314. Although the CSS 204 may also return the code image (for example by concatenating the code image with the signature), it is sufficient to return just the computed code signature since the code image is already known to the client 202A and was not modified by the server 204.

In block 316, the privileged client 202A receives the signature. Then, the code image, together with the code signature is installed or uploaded to a code download server (CDS) 206 typically controller or managed by a network operator. The signed image and code signature are then stored by the CDS 206 for later provision to requesting target devices 208.

In block 322A, target device 208A (which is of a Model A type) requests the code image. That request is received by the CDS 206 in block 324, and in response, the CDS 206 transmits the code and signature to the target device 208A, as shown in block 326. That code and signature is received by target device 208A, as shown in block 328A. The target device 208A verifies the code signature, and if the code signature is correctly verified, executes new code, as shown in blocks 330A and 332A.

In block 322B, target device 208B (which is of a Model B type) requests the code image. That request is also received by the CDS 205 in block 324, and in response, the CDS 206 transmits the code and signature to the target device 208B, as shown in block 326. The requested code and signature is received by the target device 208B, as shown in block 328B. Target device 208B verifies the code signature, and if the code signature is valid, executes the new code image, as shown in blocks 330B and 322B.

Both target device types (Model A and Model B) can execute the code image because the code image was intended for use in by all target devices 208, and the code image does not include any additions or modifications that will only be understood by a subset of the target devices 208A. An embodiment wherein the client 202 is not permitted to provide code to all of the target devices 208 but rather only a subset of such devices (such as target device 208A, but not target device 208B) is discussed below.

Figure 4:
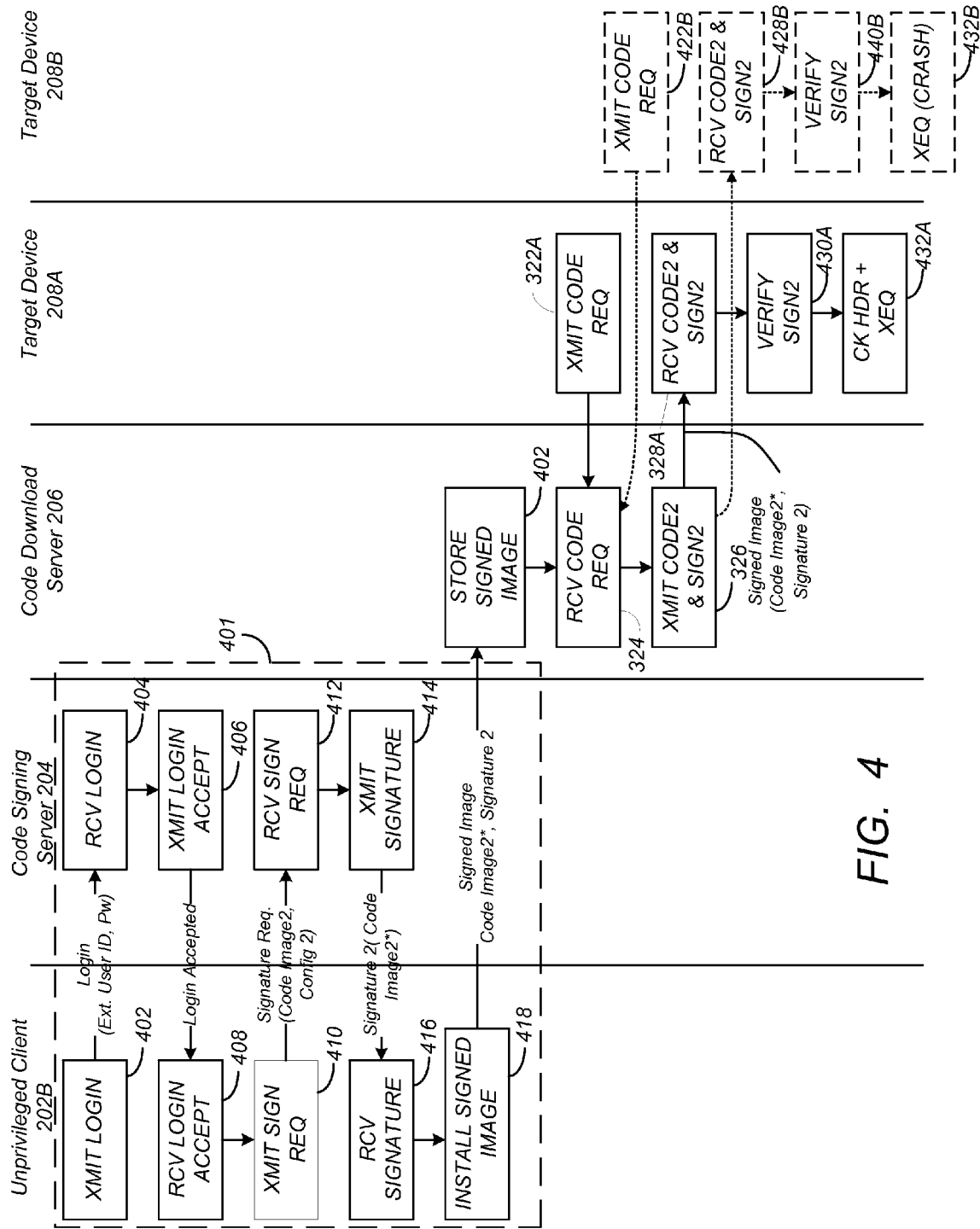
FIG. 4 is a diagram illustrating a process by which an unprivileged client signs and delivers code images intended for use in a subset of target devices.

FIG. 4 is a diagram illustrating the foregoing first embodiment of a process by which a client 202 that is external to the CSS 204 or otherwise unprivileged (hereinafter referred to as an unprivileged client 202B submits code images to the Code Signing Server 204 intended for use in only a subset of target devices, including target device 208A and excluding target device 208B. With respect to providing code to target devices 208, unprivileged client 202B has reduced privileges, since it is authorized provide code only to a subset of the target devices 208 (e.g. target devices of Model A, such as target device 208A) but not to other devices in the set of target devices (e.g. target devices of Model B such as target device 208B).

Unprivileged client 202B may be an external user that is (for example) employed by or otherwise affiliated with the network operator that controls the CDS 206, but has does not have privileges which permit them to provide code images to all of the target devices 208, but rather only a subset of such target devices. For example, some of the target device 208 models may be targeted to competing network operators and it may be inappropriate to enable this external user for signing code that works in those target device 208 models. For example, it is possible for two network operators to use the same target devices 208 to provide service to their network subscribers. However, it is undesirable for subscribers of network A to be able to install a copy of software image intended for the target devices 208 of network B on their devices. This is because different network operators may have different functional limitations and requirements (e.g. bandwidth) that are enforced by the software installed on the target devices 208. Further, operators of target devices 208 also may include their own branding and advertising (for example, target devices 208 may be subscriber-configurable using administrative pages that have network operator-specific interfaces or splash screens.

The process beings with an optional login procedure wherein the unprivileged client 202B logs into a CSS 204 by transmitting a login request, as shown in block 402. The login request may comprise credentials such as an identifier of the unprivileged client 202B making the login request (user ID) and a secret password. The unprivileged client 202B may log in to the CSS 204 over a web interface using a standard browser like IE or Firefox. Alternatively, the login may be accomplished via an online transaction with a unprivileged client 202B application and without any user interaction.

The CSS 204 receives the login request as shown in block 404, checks the login credentials to verify that the unprivileged client 202B is authorized to request signature of an image. If the unprivileged client 202B is authorized, the CSS 204 transmits a message to the unprivileged client 202B indicating that the login credentials have been accepted. This message is received by the unprivileged client 202B, as shown in block 408. After verifying the unprivileged client 202B credentials of the user, the CSS 204 enters a state where it will accept code signing requests, but only based on code signing configurations for which a particular user of the unprivileged client 202B is authorized.

In block 410, the unprivileged client 202B submits a software image (code image2) to the CSS 204 for signing and specifies a code signing configuration "Config2". This specific configuration "Config2" specifies that the code image to be signed is intended for only a particular subset of the set of target devices 208. As described further below, this is implemented by the CSS 204 modifying the code to add additional header information described below that can only be properly interpreted by the subset of the target devices that are intended to receive the code image. The additional header information may include the name of the network operator controlling the CDS 206.

This request is received by the CSS 204, as shown in block 412. The CSS 224 examines the request to determine the requested configuration, and determine if the requesting client 202B has sufficient privileges to have the code signed using the requested configuration. Once again, if the requesting client 202 has insufficient privileges to request the signing of the code according to the requested configuration, the request is denied. If, however, the requesting client has sufficient privileges to request signing of the code according to the requested configuration, the code is signed according to that requested configuration.

In the example illustrated in FIG. 4, the unprivileged client 202B has requested that the code image (Code Image2) be signed according to a second configuration ("Config2"), thus indicating that the code image is to be executable by only a subset of the set of target devices 208 (e.g. those of Model A). The CSS 204 reads the requested configuration, and in response, the CSS 204 modifies the code image (thereby creating Code Image 2*) such that only those subset of target devices 208 can recognize and execute the code image. In one embodiment, the code image is modified by adding data to the code image, such as an additional header (HDR). That additional header HDR may also include an identifier of the unprivileged client 202B such as an operator name ("oper1"). The code image may be modified by adding the HDR to the code image in a number of different ways. For example, the HDR may be pre-pended at the beginning of the code image, or may be in the middle or at the end of the code image as well.

For additional flexibility, the request that the code image be signed may include a model designation (e.g. Model A) indicating to the CSS 204 that the code should be restricted only to the indicated model. Further, a code signing configuration on CSS 204 may designate a plurality of allowable models (e.g. Model X and Y in addition to Model A), in which case the CSS 204 accepts and signs code requests for Config2 that specify any of Models A, X or Y. This allows the administrator to occasionally add a new model to an existing configuration, if the policy allows sharing the code image between such multiple models.

FIGS. 5A and 5B are diagrams illustrating one embodiment of a code image and a modified code image, respectively. Unmodified code image 500 may comprise data 502 and instructions 504 that are to be executed by the target device 208. The CSS 204 generate the modified code image 500' by modify the code image 500 to include an HDR 506 having the value of the operator name (oper1) at logical offsets where instructions 504 are ordinarily disposed. The subset of devices 208 are configured to correctly interpret the HDR 506 inserted in the code image 500, thus, can read the data within the HDR 506 and use it accordingly. However, devices 208 that are not configured to correctly interpret the HDR 506 will attempt to execute the HDR 506 as if it were an instruction, resulting in a fault.

Hence, the HDR 506 is be added to the code image 500 such that it is understood by target devices 208 it is intended for (e.g. target devices 208A that are members of the subset of devices such as those that are Model A), but not understood by target devices 208 the image is not intended for. For example, the HDR 506 may be added to the code image 500 in a manner (e.g. location and/or protocol) such that devices of type Model A (target device 208A) understand and operate on (e.g. execute) the code, but devices of another type (e.g. Model B, or target device 208B) do not understand and cannot operate on the code (for example, causing a crash or a software or hardware fault when the execution of the code is attempted). Model A target devices 208A may be newer devices that can recognize the added HDR 506 in the code image as added data, while Model B target devices 208B may be older devices which are not designed to be recognize the added HDR 506 as added data, and attempt to execute that data as if it were instructions as described above. As a result, the added HDR 506 would cause the model B target device 208B to operate incorrectly or crash.

The HDR 506 may also comprise data that that is necessary for the use of the code image. For example, the code image may comprise encrypted instructions, and the HDR 506 may include data that only the intended target devices 208 can use to decrypt or otherwise decode the those encrypted instructions.

Returning to FIG. 4, the CSS 204 then computes the signature over the modified code image 500' (Code Image 2*) and transmits or returns it back to the unprivileged client 202B, as shown in block 414. In one embodiment, the CSS 204 returns modified code image 500' (e.g. Code Image 2*) concatenated together with the signature computed over the modified code image. But the CSS 204 may instead return just the signature (and not the modified code image) since the unprivileged client 202B should be able to construct the same modified code image (code2) as well.

The code signature (Signature2) along with the modified code image 500' (code image2) which includes the HDR 506 (with the value oper1) is then transmitted to the CDS 206 for storage. Each target device 208 can thereafter obtain a download of the new code from the CDS 206. Typically, the CDS 206 is managed and operated by the network operator.

In block 422A, target device 208A (which is of Model A) transmits a request for an updated code image, as shown in block 422A. That request may include information describing the target device 208A making the request, such as its model designation or serial number. That request is received by the CDS 206, as shown in block 424. The CDS 206 then transmits the requested code image 500' (modified to include the HDR 506) and signature (generated from the modified code image 500') to the requesting target device 208A, as shown in block 426. In block 428A, the target device 208A receives the modified code image 500' and signature (signature2).

Target device 208A then verifies the code signature, as illustrated in block 430A. If verification fails, target device 208A does not install or execute the modified code image 500'. If the signature is verified, target device 208A (Model A) examines the code image to first check the HDR 506 to make sure that it includes a correct or expected network operator name (oper1). After successful verification that the HDR 506 includes the expected operator name, the target device 208A successfully executes the new code image 500'. Successful execution is made possible because target device 208A is configured to examine the received code image 500' to extract and properly process the information in the HDR 506. For example, if the HDR 506 simply comprises the expected network operator name (oper1) appended N bytes at the beginning of the code image, target devices 208A of Model A may configured to regard the first N bytes as referencing the operator name, and read those first N bytes as data instead of one or more instruction(s), then execute the remaining bytes of the code image normally.

In block 422B, target device 208B (Model B) transmits a request for an updated code image. Likewise, that request may include information describing the target device 208 making the request such as its model designation or serial number. That request is received by the CDS 206, as shown in block 424. The CDS 206 transmits the requested code image (modified to include the HDR) and signature (generated from the modified HDR) to the requesting target device 208B, as shown in block 426. In block 428B, the target device 208B receives the code image and signature.

As was the case with target device 208A, target device 208B then verifies the code signature, as illustrated in block 430B. If verification fails, target device 208B does not install or execute the (modified) code image. If the signature is verified, target device 208B (Model B) attempts execution of the modified code image that includes HDR 506, because target device 208B is not configured (e.g. via logic or instructions) to check the HDR 506 (to assure that identifies the proper operator, "oper1") and/or to refrain from executing the HDR 506 as if it were one of the instructions of the software image. Since target device 208B is not one of the target devices 208A that are configured to expect and properly process the code image modified to include the HDR 506, target device 208B simply interprets the HDR 506 portion of the modified code image 500' as just part of the code image. Target device 208B eventually attempts executing HDR 506 as if it were processor instructions which results in an exception which will likely halt or reset the device. If desired, the HDR 506 can be inserted into a portion of the code image that assures halting or resetting of the device, or some other desired action. This is because the modified signed code image was only intended to run on target devices 208A of Model A. The attempt to load and execute that code image onto a target device 208B of Model B was unauthorized and therefore, as intended, resulted in that device halting or resetting.

Note that Model A target devices 208A, which are configured understand that a portion of the code image includes and HDR 506 and to properly process that HDR 506, still check the HDR 506 contents to make sure that the received code image was obtained from an expected network operator and not a different (and perhaps untrusted) source or network operator. If the network operator name included within the HDR 506 (e.g. oper1) doesn't match the expected network operator name, then the modified code image 500' is still rejected by that device 208 and not executed, even though such execution would not cause a crash or other processor fault.

The inclusion of the HDR 506 within the signed code image can be used to prevent the code image from executing on legacy devices (such as Model B devices target device 208B) that are not aware of the new (modified) code image 500 format (that include the HDR) and are not able to explicitly validate if the code image was signed with correct parameters that match a model of a specific device.

In the foregoing example, the HDR 506 included the network operator name so that the target device 208A could verify that the code image was from the network operator. However, the network operator name is only one example of attributes that could be used. For example, in addition to or in the alternative to the operator name, the HDR may include a model designation (e.g. Model A). Devices configured to search for and extract the HDR from the code image can verify that their device model matches the model name included in the HDR, instead of or in addition to verifying the operator name.

Second Embodiment

Figure 6:
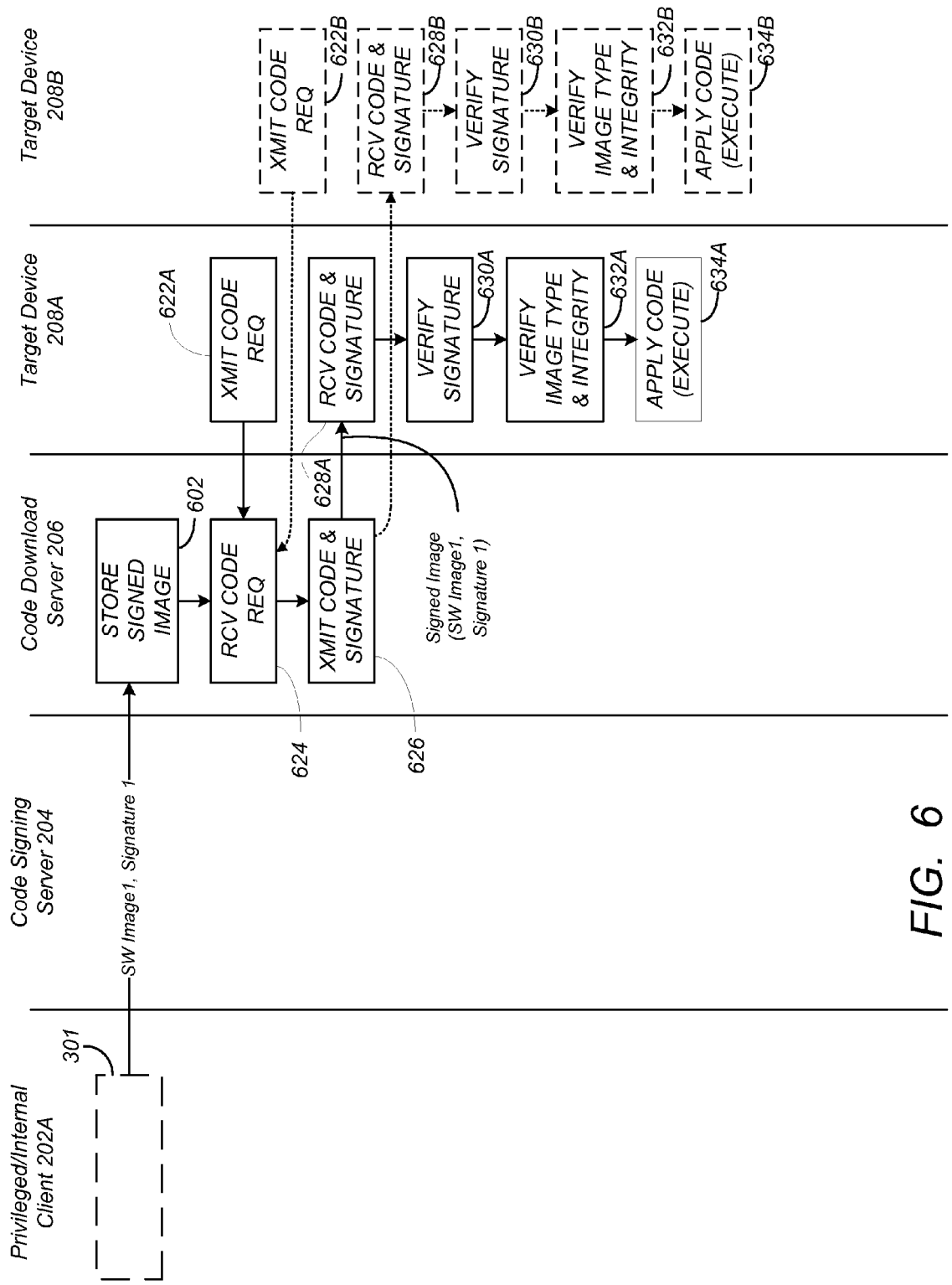
FIG. 6 is a diagram illustrating a second embodiment of the code-signing and delivery process, that provides additional optimization for signatures that are verified during a secure download.
Figure 7A:
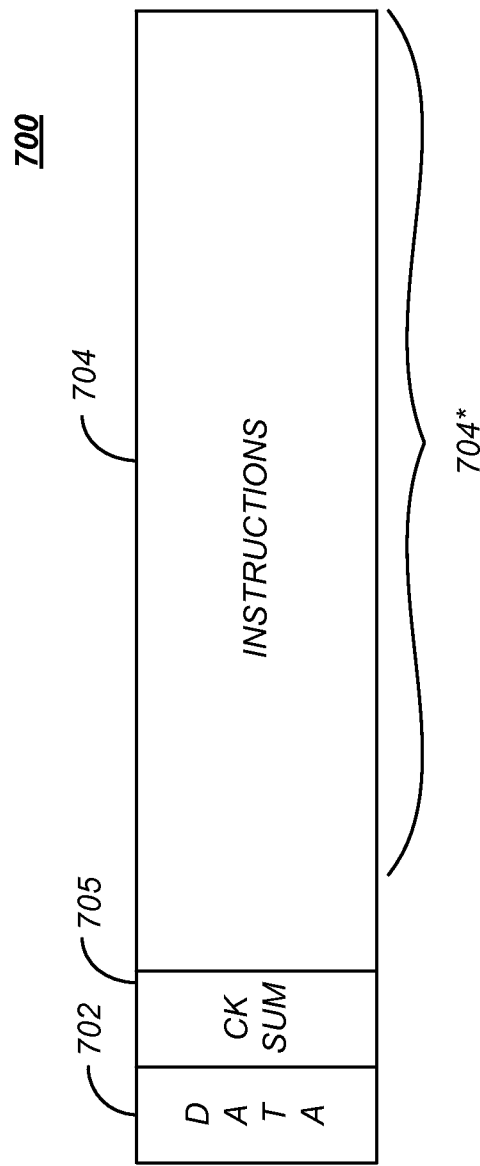
FIGS. 7A and 7B are diagrams of an embodiment of an exemplary code image.
Figure 7B:
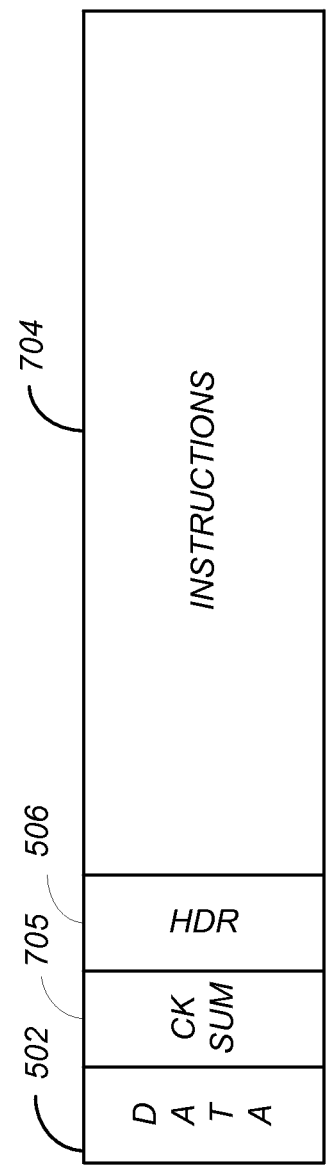
Figure 8:
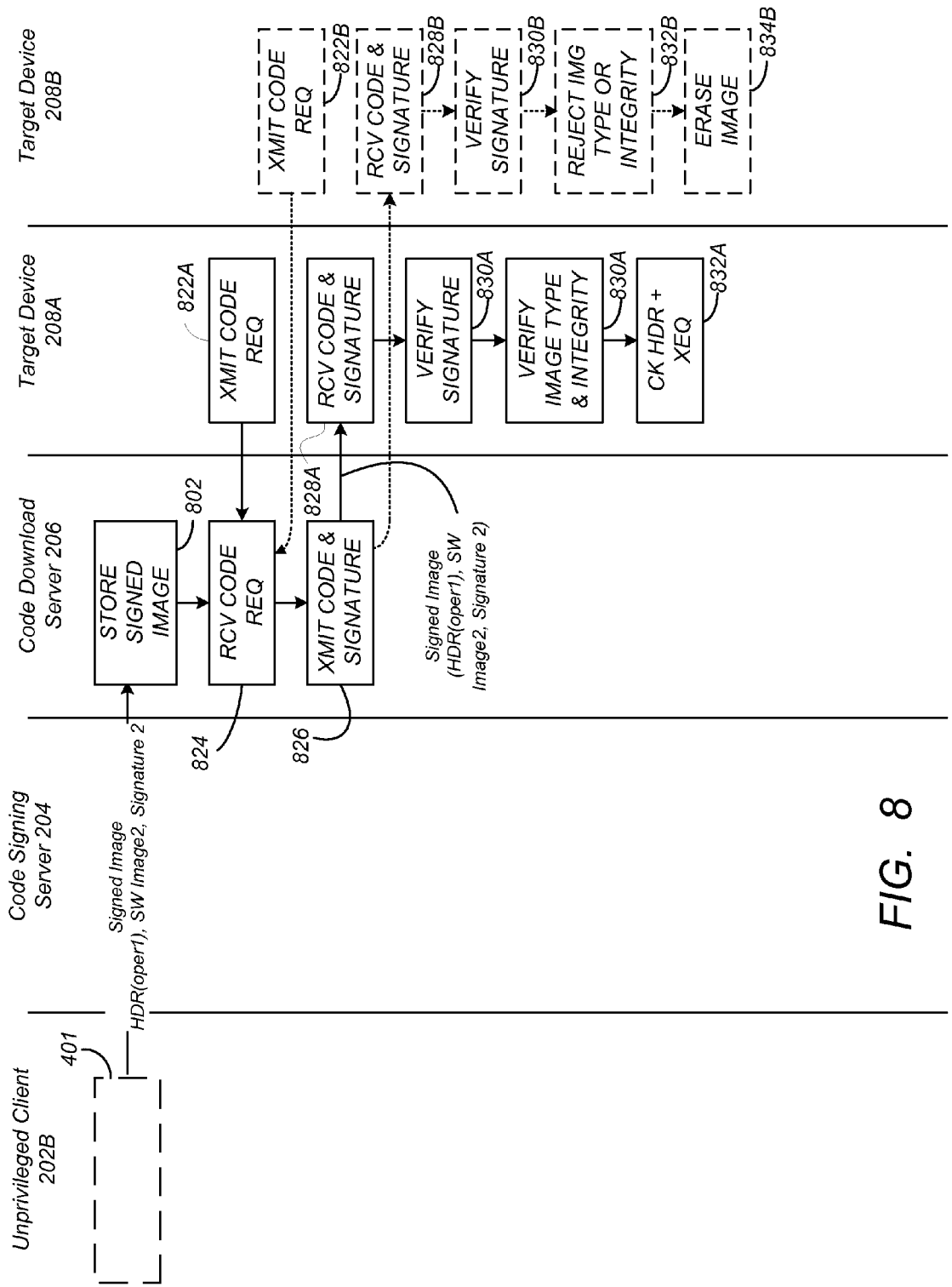
FIG. 8 is a diagram further illustrating the second embodiment of the code-signing and delivery process.

FIGS. 6-8 are diagrams illustrating a second embodiment of the code-signing and delivery process, that provides additional optimization for signatures that are verified during a secure download.

For some devices 208, after the code signature is already validated, a secondary integrity check may be made to verify a checksum such as a CRC32 or a magic number (predefined pattern) at a fixed offset, before executing the code image 500 itself. This secondary check may performed to assure that the code image 500 is of correct type and was built correctly for the particular target device 208 model it is delivered to before execution of the code image 500 is attempted. If this secondary check fails, then the device 208 will reject the newly downloaded code image 500 and the code image 500 will not be permanently stored or executed by the device 208, even if the signature check passes.

In this case, the extra header (HDR 506) may be intentionally placed at a memory location or offset used by legacy devices (e.g. target devices 208B of Model B) to perform this additional integrity check. For example, when the code image is built, a checksum may be calculated over the Instructions area 704* that does not include HDR 506. But HDR 506 is then added in such a way that a device validating the same checksum 705 will try to calculate it over both HDR 506 and the Instructions area 704* which will fail since the original checksum value was calculated over the different set of data.

FIG. 7A is a diagram of another embodiment of an exemplary code image 700 This code image 700 also includes data 702 and instructions 704, but also includes integrity data (e.g. checksum data CKSUM 705) that is used to perform an additional integrity check.

FIG. 7B is a diagram of a modified exemplary code image 700'. Note that the exemplary code image 700 of FIG. 7A has been modified to place the HDR 506 in the memory location or offset used by legacy devices to perform the integrity check. Placed in this location, the HDR 506 will cause legacy devices to reject the new code image before they attempt execution of the new code image 500' (since it will fail the checksum or other integrity check that will be calculated over both HDR 506 and Instructions in area 704* even though the checksum in the code image was only calculated over Instructions in area 704*), resulting in a more graceful response to the incorrectly supplied code image 500'. Alternatively, the HDR 506 could also be placed such that it writes over the CKSUM field 705 and that will also cause the checksum validation to fail. For example, in the case that an operator or client 202 makes an innocent mistake by trying to download a new code image into an incorrect device 208 model, this embodiment caused the target device 208B receiving the new code image to reject the new code download gracefully and to resume normal functionality, for example by reverting to execution of the previously installed code image. Non-legacy devices performing the integrity check would know to skip HDR 506 during the checksum calculation and thus they would be able to pass the integrity check. Alternatively, non-legacy devices may perform an integrity check, for example, by including the checksum data in the HDR itself, or inserting the checksum or other integrity data elsewhere in the code image, perhaps with a pointer to that inserted location being included within the HDR 506.

FIG. 6 is a diagram illustrating the another embodiment of a process by which a client 202 that is internal to the CSS 204 or otherwise privileged (hereinafter referred to as a privileged client 202A) signs and delivers code images intended for use in all target devices, including target device 208A and target device 208B. This embodiment is similar to the embodiment illustrated in FIG. 3. However, in this embodiment, the code image includes the integrity check value. Turning to FIG. 6, the process beings by performing the operations illustrated in block 301 of FIG. 3 (but not repeated in FIG. 6 for purposes of conciseness. In this process, the privileged client 202A logs into the CSS 204, and after the login is accepted, transmits a signature request to the CSS 204, which may comprise the code image and requested configuration. In this embodiment, the code image (SW Image 1) includes data 705 for the integrity check described above, and since the code image 700 is intended for all target devices 208, the CSS 204 signs the code image without modification. That signature (signature1) and perhaps the code image itself is provided to the privileged client 202A and thereafter to the code download server 206 so that it is available for target devices 208 to download.

Similarly the operations depicted in FIG. 3, the target device 208A transmits a request to receive the code image from the CDS 206, as shown in block 622A. The CDS 206 receives the request and transmits the code and signature to the target device 208A as shown in blocks 624 and 626. The target device 208A receives the code image and signature and verifies the signature, as shown in blocks 628A-630A.

After signature validation, the code image 700 is validated for integrity (e.g., the code image 700 is subject to an operation with the result compared to the checksum or integrity value 705) and for a correct image type, as shown in block 632A. In this case, the signed image 700 doesn't have HDR 506, and this check on a new device 208 passes. After this step, if the code image was just downloaded in temporary memory—it may be saved persistently in the device 208, and executed, as shown in block 634A.

A similar process occurs with respect to target device 208B. After requesting and receiving the code image and signature, as shown in blocks 622B, 624, 626, and 628B, the received signature is validated, as shown in block 630B. Next, the code image 700 is validated for integrity (e.g., verified using the integrity value disposed in a code image portion 705 such as the header or footer fields) and for a correct image type. In this case, the signed image doesn't have HDR 506 and this check on a legacy device 208 also passes. After this step, if the code image was just downloaded—it is also persistently stored in the device 208 for execution.

FIG. 8 is a diagram illustrating the foregoing first embodiment of a process by which a client 202 that is external to the CSS 204 or otherwise unprivileged (hereinafter referred to as an unprivileged client 202B) signs and delivers code images intended for use in only a subset of target devices, including target device 208A and excluding target device 208B. This embodiment is similar to the embodiment illustrated in FIG. 4. However, in this embodiment, the code image includes the integrity check value. Turning to FIG. 8, the process beings by performing the operations illustrated in block 401 of FIG. 4. In this process, the unprivileged client 202B logs into the CSS 204, and after the login is accepted, transmits a signature request to the CSS 204, which may comprise the code image and requested configuration. In this embodiment, the code image (SW Image 2) includes data 705 for the integrity check described above, and since the code image 700 intended only for a subset of target devices 208, the CSS 204 modifies the code as illustrated in FIG. 7B before signs the code image. The resulting signature (signature2) and perhaps the code image itself is provided to the unprivileged client 202B and thereafter to the code download server 206 so that it is available for target devices 208 to download.

Similarly the operations depicted in FIG. 4, target device 208A transmits a request to receive the code image from the CDS 206, as shown in block 822A. The CDS 206 receives the request and transmits the code and signature to the target device 208A as shown in blocks 824 and 826. The target device 208A receives the code image and signature and verifies the signature, as shown in blocks 828A-830A.

After signature validation, the code image is validated for integrity (e.g., a checksum is generated and verified against the included checksum value) and for a correct image type. In this case, the signed image 700' includes the HDR 506, but this is a new device 208 that knows the modified code image 700' format and is able to skip HDR 506 and still verify all the necessary fields. After this step, if the code image 700' was temporarily downloaded—it will be saved persistently in the device 208 for later execution. These operations are depicted in blocks 830A and 832B.

Also similarly the operations depicted in FIG. 4, target device 208B transmits a request to receive the code image 700' from the CDS 206, as shown in block 822B. The CDS 206 receives the request and transmits the code and signature to the target device 208*b* as shown in blocks 824 and 826. The target device 208B receives the code image and signature and verifies the signature, as shown in blocks 828B-830B.

After signature validation, the code image header or footer fields are validated for integrity (e.g., checksum is verified) and for a correct image type. In this case, the signed image does include HDR 506 in a location that interferes with this check and so the code image is rejected by the legacy device 208 this is shown in block 832B. Because of the rejection shown in block 832B, the code image 700' is not saved in the legacy device. Instead, the code image 700' is erased, and the device 208 will resume its normal operation with the previously installed code image.

Hardware Environment

Figure 9:
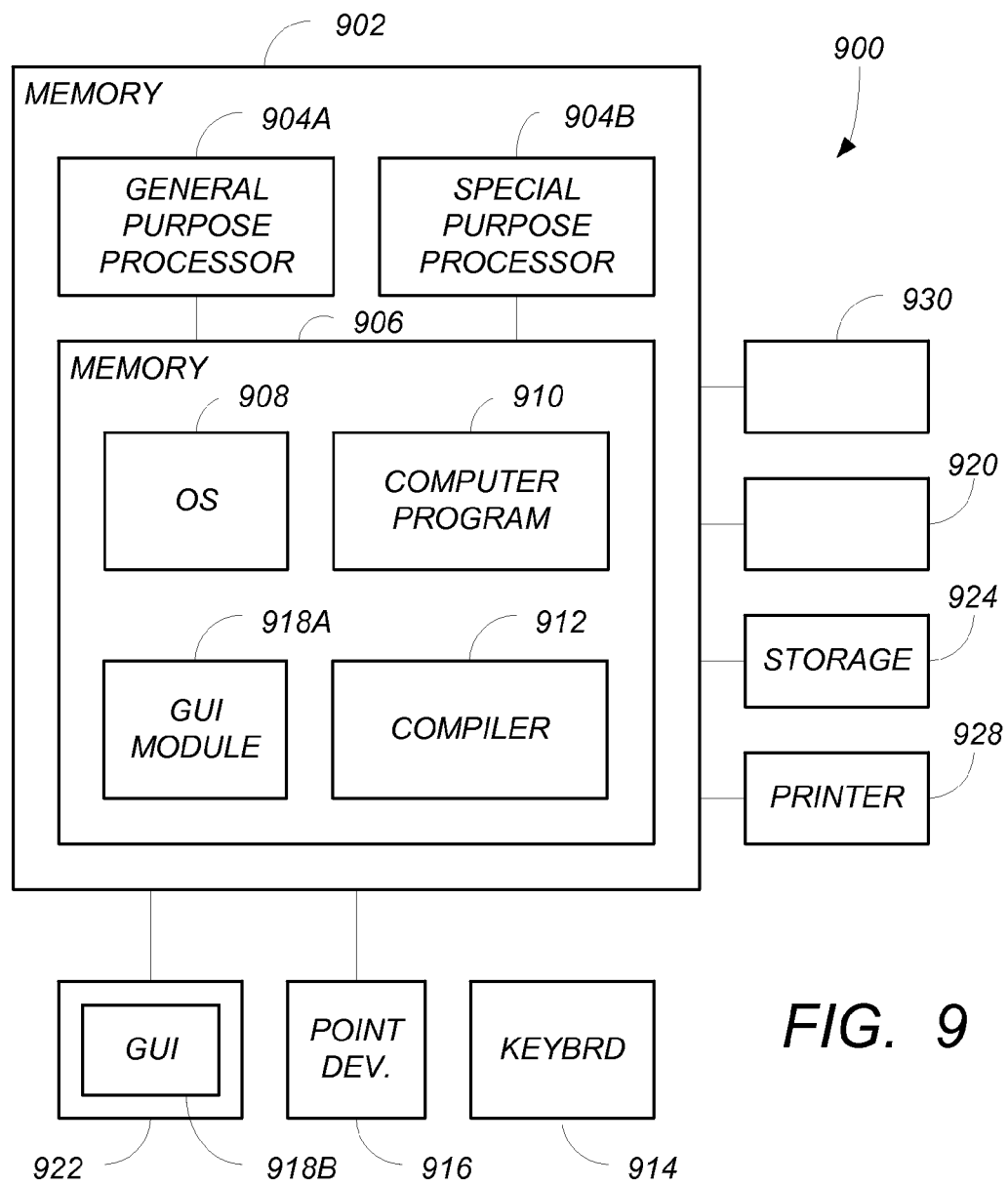
FIG. 9 is a diagram illustrating an exemplary computer system 900 that could be used to implement elements of the present invention.

FIG. 9 is a diagram illustrating an exemplary computer system 900 that could be used to implement elements of the present invention, including the clients 202, the CSS 204, the CDS 206, and the target device(s) 208. The system 900 includes a computer 902 that comprises a general purpose hardware processor 904A and/or a special purpose hardware processor 904B (hereinafter alternatively collectively referred to as processor 904) and a memory 906, such as random access memory (RAM). The computer 902 may be coupled to other devices, including input/output (I/O) devices such as a keyboard 914, a mouse device 916 and a printer 928.

In one embodiment, the computer 902 operates by the general purpose processor 904A performing instructions defined by the computer program 910 under control of an operating system 908. The computer program 910 and/or the operating system 908 may be stored in the memory 906 and may interface with the user and/or other devices to accept input and commands and, based on such input and commands and the instructions defined by the computer program 910 and operating system 908 to provide output and results.

Output/results may be presented on the display 922 or provided to another device for presentation or further processing or action. In one embodiment, the display 922 comprises a liquid crystal display (LCD) having a plurality of separately addressable pixels formed by liquid crystals. Each pixel of the display 922 changes to an opaque or translucent state to form a part of the image on the display in response to the data or information generated by the processor 904 from the application of the instructions of the computer program 910 and/or operating system 908 to the input and commands. Other display 922 types also include picture elements that change state in order to create the image presented on the display 922. The image may be provided through a graphical user interface (GUI) module 918A. Although the GUI module 918A is depicted as a separate module, the instructions performing the GUI functions can be resident or distributed in the operating system 908, the computer program 910, or implemented with special purpose memory and processors.

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 902 may also implement a compiler 912 which allows an application program 910 written in a programming language such as COBOL, C++, FORTRAN, or other language to be translated into processor 904 readable code. After completion, the application or computer program 910 accesses and manipulates data accepted from I/O devices and stored in the memory 906 of the computer 902 using the relationships and logic that was generated using the compiler 912.

The computer 902 also optionally comprises an external communication device such as a modem, satellite link, Ethernet card, or other device for accepting input from and providing output to other computers.

In one embodiment, instructions implementing the operating system 908, the computer program 910, and/or the compiler 912 are tangibly embodied in a computer-readable medium, e.g., data storage device 920, which could include one or more fixed or removable data storage devices, such as a zip drive, floppy disc drive 924, hard drive, CD-ROM drive, tape drive, or a flash drive. Further, the operating system 908 and the computer program 910 are comprised of computer program instructions which, when accessed, read and executed by the computer 902, causes the computer 902 to perform the steps necessary to implement and/or use the present invention or to load the program of instructions into a memory, thus creating a special purpose data structure causing the computer to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 902.

Although the term "computer" is referred to herein, it is understood that the computer may include portable devices such as cellphones, portable MP3 players, video game consoles, notebook computers, pocket computers, or any other device with suitable processing, communication, and input/output capability.

The foregoing describes a solution for code signing with a common signing key across many different device models, such that legacy devices which do not understand the new code signing format will crash while trying to execute a signed code image targeted only for new device models with specific parameters.

This addresses a specific problem where a device manufacturer may no longer be the only entity requesting that code intended for it's devices be signed with the manufacturer's signing key that might be used across several models. The foregoing solution permits network operators to perform such code signing but only for the new devices in which network operator is specifically interested. Legacy devices 208 which do not understand the additional information in the signed code image (the HDR 506) will encounter the HDR 506 while trying to execute the code image it as if the HDR were one or more processor instructions, causing such devices 208 to crash.

At the same time, the HDR 506 contains parameters such as the operator name (COMCAST, for example) that are checked by newer devices. If in the future device manufacturers were asked to provide code signing capabilities to other network operators such as COX or CHARTER, each such network operator would have it's own specific operator name inside HDR 506 and a device 208 configured for one operator would reject code signed with another operator's name. This would be enforced by providing each operator access only to their own configuration with their own name on the code signing server 204.

Alternatively, it may be possible on some legacy devices to reject a code image with HDR 506 after the signature check, while the device 208 checks a newly downloaded code image for integrity or to make sure the header or footer fields match this device 208 model. HDR 506 can be placed in such a location in the code image, such that legacy devices will fail this check and will not even save the downloaded code update. This allows legacy devices to reject code images that are not intended for that device model more gracefully than the first alternative.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

For example, although the foregoing embodiments are described for purposes of illustration as referring to the signing and transmission of software code or code images, the same procedures may be used to transmit data of any time that is used or operated on by the target device upon receipt to generate output results. Hence, the illustrated CSS 204 may more generally comprise a data signing server and the CDS 206 may more generally comprise a data download server. Further, although reference is made below to the execution of code (in some cases, unsuccessfully), analogous results may be obtained by using the target devices to operate on signed data (in some cases, unsuccessfully).

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of signing data, comprising:
 receiving, from a requester, a request to sign the data according to a requested configuration selected from a first configuration, in which the data is for use with any of a set of devices, and second configuration in which the data is for use only with a subset of the set of devices;
 modifying the data according to the requested configuration by:
  determining if the selected configuration is the first configuration;
  if the selected configuration is the first configuration, verifying that the requestor is permitted to sign the data in the first configuration;
  determining if the selected configuration is the second configuration; and
  adding an identifier to the data if the selected configuration is the second configuration;
 generating a data signature using the modified data;
 transmitting the generated data signature to the requestor;
 receiving the modified data and the data signature in a device of the subset of devices;
 verifying the data signature by the device;
 determining if the added identifier matches an expected identifier by the device;
 accepting the modified data for use by the device only if the data signature is verified and the added identifier matches the expected identifier, wherein the data comprises a code image and the added identifier renders the modified code image unusable by devices of the set of devices other than the subset of devices.

2. The method of claim 1, wherein the data signature is generated according to a data signing format, and the request includes configuration data identifying the data signing format.

3. The method of claim 1, wherein request further comprises a data signing key and generating the data signature using the modified data comprises:
 hashing the modified data and signing the hashed modified data according to a data signing key.

4. The method of claim 3, wherein the request further includes an identifier of the requestor and the data to be signed.

5. The method of claim 4, wherein the identifier includes a network operator identifier or a device model identifier.

6. The method of claim 1, wherein the added identifier identifies the requestor as a putative source of the data.

7. The method of claim 1, wherein:
 a unmodified data comprises a field having an integrity value verifying the integrity of at least a portion of the unmodified data, the integrity value computed from a function of the at least a portion of the unmodified data; and
 the data is modified by adding the identifier in the field.

8. The method of claim 7, further comprising:
 receiving the modified data and the data signature in a device of the set of devices;
 verifying the data signature; and
 computing a integrity value from the at least a portion of the unmodified data; and
 accepting the data for use by the device only if the data signature is verified, and the computed integrity value matches the received integrity value.

9. An apparatus for signing data, the apparatus comprising a processor and a communicatively coupled memory storing processor instructions comprising instructions for:
- receiving, from a requestor, a request to sign the data according to a requested configuration selected from a first configuration, in which the data is for use with any of a set of devices, and a second configuration in which the data is for use only with a subset of the set of devices;
- modifying the data according to the requested configuration by:
  - determining if the selected configuration is the first configuration;
  - if the selected configuration is the first configuration, verifying that the requestor is permitted to sign the data in the first configuration;
  - determining if the selected configuration is the second configuration; and
  - adding an identifier to the data if the selected configuration is the second configuration;
- generating a data signature using the modified data; and
- transmitting the generated data signature to the requestor,
- wherein unmodified data comprises a field having an integrity value verifying the integrity of at least a portion of the unmodified data, the integrity value computed from a function of the at least a portion of the unmodified data, and the data is modified by adding the identifier in the field, and wherein the modified data comprises a code image and the added identifier renders the modified code image unusable by devices of the set of the devices other than the subset of devices.

10. The apparatus of claim 9, wherein the data signature is generated according to a data signing format, and the request includes configuration data identifying the data signing format.

11. The apparatus of claim 9, wherein request further comprises a data signing key and the instructions for generating the data signature using the modified data comprise instructions for:
- hashing the modified data and signing the hashed modified data according to a data signing key.

12. The apparatus of claim 11, wherein the request further includes an identifier of the requestor and the data to be signed.

13. The apparatus of claim 12, wherein the identifier includes a network operator identifier or a device model identifier.

14. The apparatus of claim 9, wherein the added identifier identifies the requestor as a putative source of the data.

* * * * *